United States Patent [19]

Manson et al.

[11] Patent Number: 4,977,394

[45] Date of Patent: Dec. 11, 1990

[54] DIAGNOSTIC SYSTEM FOR AN AUTOMATIC APPLIANCE

[75] Inventors: Larry J. Manson, Baroda Township; Michael D. Goslee, St. Joseph Township, both of Mich.

[73] Assignee: Whirlpool Corporation, Benton Harbor, Mich.

[21] Appl. No.: 432,202

[22] Filed: Nov. 6, 1989

[51] Int. Cl.$^5$ ............................................. G08B 21/00
[52] U.S. Cl. ................................. 340/679; 314/551.01
[58] Field of Search ................... 340/679; 364/551.01, 364/400

[56] References Cited

U.S. PATENT DOCUMENTS

3,939,453  2/1976  Schroeder ........................... 364/900
4,158,432  6/1979  van Bavel ........................... 371/16.4
4,245,309  1/1981  Kiefer ................................. 364/400
4,498,130  2/1985  Uchida ............................... 364/188
4,586,034  4/1986  Nakamine .......................... 340/679
4,630,191  12/1986 Strosser ............................ 364/186

Primary Examiner—Glen R. Swann, III
Attorney, Agent, or Firm—Hill, Van Santen, Steadman & Simpson

[57]  ABSTRACT

An automatic appliance includes a diagnostic system, wherein a user is alerted to request servicing for major operational errors, and error data is stored for later retrieval by service personnel. A special overlay template is provided for the service personnel to execute special routines via standard operational parameter input keypads of the appliance.

12 Claims, 7 Drawing Sheets

DIAGNOSTIC SYSTEM FOR AN AUTOMATIC APPLIANCE

BACKGROUND OF THE INVENTION

The present invention generally relates to automatic appliances. More particularly, the invention relates to a diagnostic system for an automatic appliance. Yet more specifically, the invention relates to a diagnostic system for an automatic washer.

There is always a possibility that an appliance may malfunction during use during its lifetime. The malfunction may be minor or major. A minor malfunction is likely to be easily rectified, many times by persons not skilled in the repair of appliances, as only minor adjustments to the appliance may be required. Further, in certain instances, the appliance may continue to operate unimpeded despite the minor malfunction. On the other hand, it is likely that a major malfunction can only be rectified by someone skilled in the repair of that particular appliance and that a major malfunction will force operation of the appliance to discontinue.

With the advent of the lowering cost and size of electronic sensors, and other related electronic products, it is possible to employ sensors and related electronics in appliances to provide data that can be helpful in diagnosing the causes of a malfunction. To this end, several diagnostic systems have been employed in automatic appliances. These systems store data for subsequent retrieval for analysis to determine the cause of a malfunction or operational error.

A diagnostic system is a system designed to implant a diagnostic routine, wherein a series of steps are undertaken to locate and identify any malfunction. Typically, in computer based diagnostic systems, a program is executed and a series of electronic elements are queried by the system to determine if any is exhibiting a state of malfunction. The electronic elements can include sensors and/or other elements such as portions of the computer.

U.S. Pat. No. 4,630,191 discloses an automatic round or roll baler having an operator controlled system. Therein, a central system includes a microprocessor controlled signal processing circuit that is responsive to signals derived from various switches for controlling the wrapping of a bale and signalling to an operator the status of the baler. The diagnostic system can be initiated by the operator from a control panel. An operator's manual leads the operator through a series of successive test steps, such as actuating switches, and the signal processor visually and audibly signals the operator as to whether or not the test step was successful.

U.S. Pat. No. 4,498,130 discloses a microprocessor controlled copying machine having a self diagnosis capability. The diagnosis operation start and stop instruction signals can be applied from either a front control panel or from remote operating switches, with one or the other instruction signals being selected to control a respective output terminal or machine component.

U.S. Pat. No. 4,245,309 discloses a microprocessor based control circuit for an automatic washer having a diagnostic system. The control circuit responds to user selected options to determine the operating sequence of the washer. Feedback systems provide detection and indication of fault conditions such as overfill and drain blockage, and initiate protective measures to prevent damage to the appliance. A diagnostic system routine is employed to sequence through the usual operating cycles in response to operator input and advance therethrough at the operator's discretion.

Operative cycle and appliance malfunctions, if any, are displayed on the control panel as the diagnostic routine is executed.

U.S. Pat. No. 4,158,432 discloses a self test feature for appliances that is embodied in a microprocessor controlled microwave oven. The self test feature is actuated through the microwave oven keypad and causes a system to sequence through test routines whereby a series of light emitting diodes of an alphanumeric display are illuminated in a predetermined order, each digit of the display counting up from 0 to 9. Keypad inputs are displayed as codes.

U.S. Pat. No. 3,939,453 discloses a diagnostic display for a machine sequence controller for an automatic grinding machine. The sequence controller controls a sequence of machine functions and provides a digital display of information, including diagnostic information. Diagnostic information is displayed on two levels. The first level is defined as "input code" which represents signals generated by a programmable controller to define the machine requirements due at a given time. These signals are compared with signals defining requirements met from input devices to determine if the sequence should be allowed to advance. The second level is defined as "cycle step commands" which represents signals sequentially generated by the controller to actuate specific machine functions. The controller can advance sequentially or non-sequentially. Circuit boards are correlated in physical location to cycle step command codes.

It would be advantageous to provide an automatic appliance, such as an automatic washer, with a diagnostic system wherein data is stored for later retrieval for analysis, and wherein the system, in identifying the fault, determines whether the fault is grave enough so as to require the need for experienced repair personnel to correct the fault. In so doing, the system can be employed so as to store data available to the skilled repair person, which data is retrievable from the normal control panel with a simple adaptive device such as an overlaying template.

SUMMARY OF THE INVENTION

The present invention provides a diagnostic system for gathering and storing data during the operation of an automatic appliance so that upon malfunction of the appliance, the data can be retrieved and analyzed to determine the cause of the malfunction. To this end, the invention includes electronic circuitry for executing diagnostic algorithms and a convertible control panel that is selectively employed either for normal control of the appliance or for execution of data retrieval algorithms. The invention also provides the methods for storage and retrieval of the data.

In an embodiment, the invention includes a template that is placed upon a control panel face so as to provide a panel face for execution of diagnostic and/or data retrieval algorithms. The template is made of a sturdy film and can be carried by service personnel and employed on each appliance requiring service.

In an especially preferred embodiment, the diagnostic system of the invention is employed in an automatic washer, including an electronic control panel.

Accordingly, it is an object of the present invention to provide an improved diagnostic system for an automatic appliance.

It is another object of the present invention to provide a diagnostic system for easy retrieval of data accumulated during operation of an automatic appliance.

These and other objects as well as advantages will become apparent from the following description of the preferred embodiments thereof, taken in conjunction with the accompanying drawings.

DETAILED DESCRIPTION OF THE PRESENTLY PREFERRED EMBODIMENTS

Figure 1:
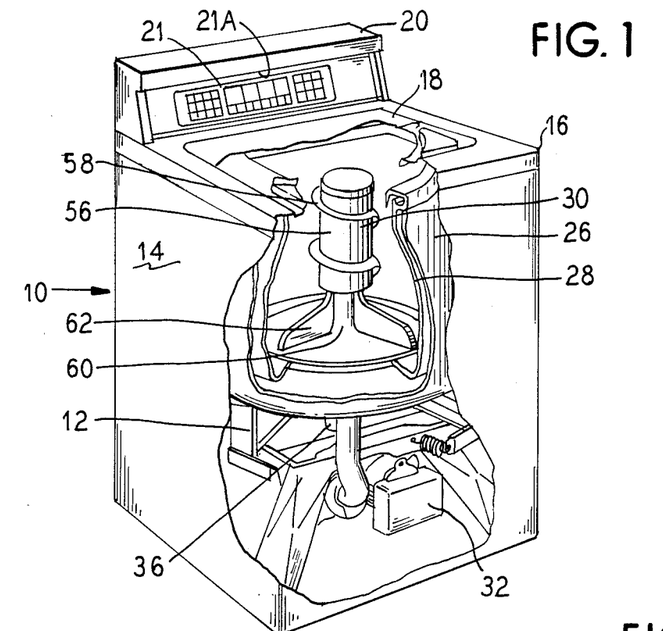
FIG. 1 is a perspective view of an automatic washer that employs a diagnostic system embodying principles of the present invention.
Figure 2:
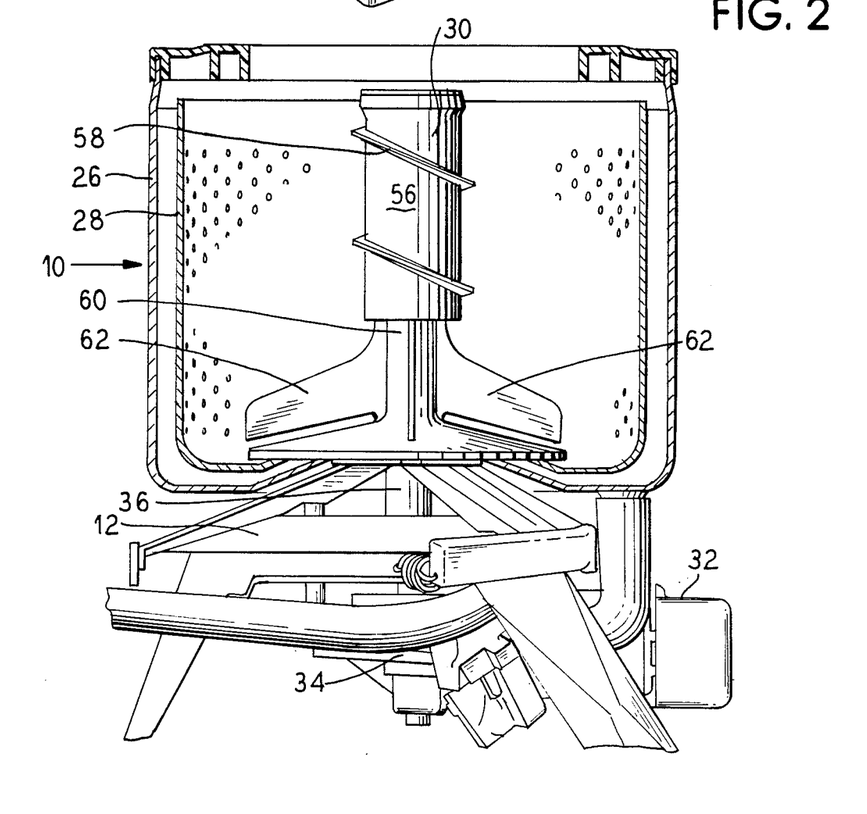
FIG. 2 is a cross-sectional view of the washer of FIG. 1.
Figure 3:
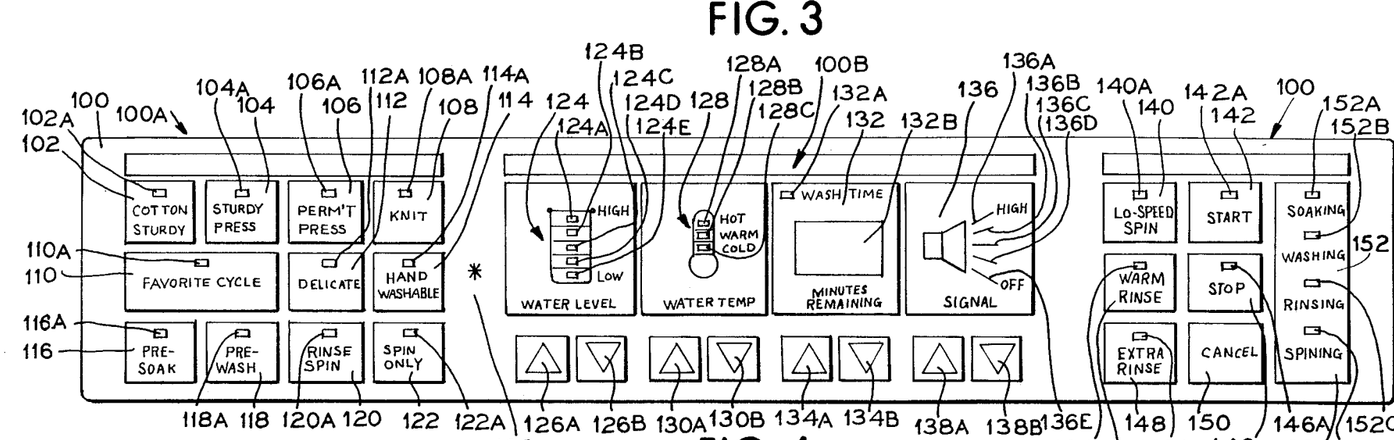
FIG. 3 is an illustration of the control panel of the washer illustrated in FIG. 1.

In FIGS. 1 and 2, there is illustrated an automatic washer generally at 10, the washer 10 being a vertical axis agitator-type washing machine having presettable controls for automatically operating the machine through a programmed series of washing, rinsing, and spinning steps. The machine includes a frame 12, exterior panel 14 forming the sides, top, front, and back, of a cabinet 16. A hinged lid 18 is provided in the usual manner for access to the interior of the washing machine 10. The washing machine 10 has a rear console 20 on which is disposed a control panel 21 with settable control means formed of a series of electronic inputs in the form of keypads as illustrated in FIG. 3. The console 20 further includes a console overhead fluorescent lamp 21A to provide appropriate illumination of the console 20.

Internally of the washing machine 10 there is disposed an imperforate liquid containing washtub 26 within which is rotatably mounted a perforate basket 28 for rotation about a vertical axis. A vertically disposed agitator 30 is connected for operation to a motor 32 through a drive mechanism, 34. Referring to FIG. 2, the agitator 30 is linked by a shaft 36 through the drive mechanism 34, which may be a reduction drive, which in turn is driven through a pulley arrangement by a motor 32. The motor 32 is mounted in a bracket arrangement, not illustrated, which connects to the frame 12 of the washer 10. The washer 10 is provided with a motor control of the type described in my co-pending U.S. patent application, Ser. No. 405,219, filed Sept. 11, 1989, the disclosure of which is hereby incorporated by reference. It will be appreciated by those skilled in the art that the diagnostic system of the present invention may be advantageously adapted for use on other controls.

It is possible to eliminate the reduction drive and link the agitator directly to an appropriately selected motor.

The shaft 36 extends upwardly from the reduction drive 34 through the tub 26 and the perforate basket 28 and connects to the agitator 30. A tub ring extends around the top of the tub 26. The agitator 30 is a dual action agitator having an upper barrel 56 with helical vanes 58, as well as a lower agitator portion 60 from which radially extends a plurality of flexible vanes 62. The flexible vanes 62 enable the agitator 30 to absorb energy as the direction of rotation is reversed, while still coupling the agitator 30 to the load provided by liquid within the tub 26 as well as any articles of clothing or fabric therein.

Figure 4:
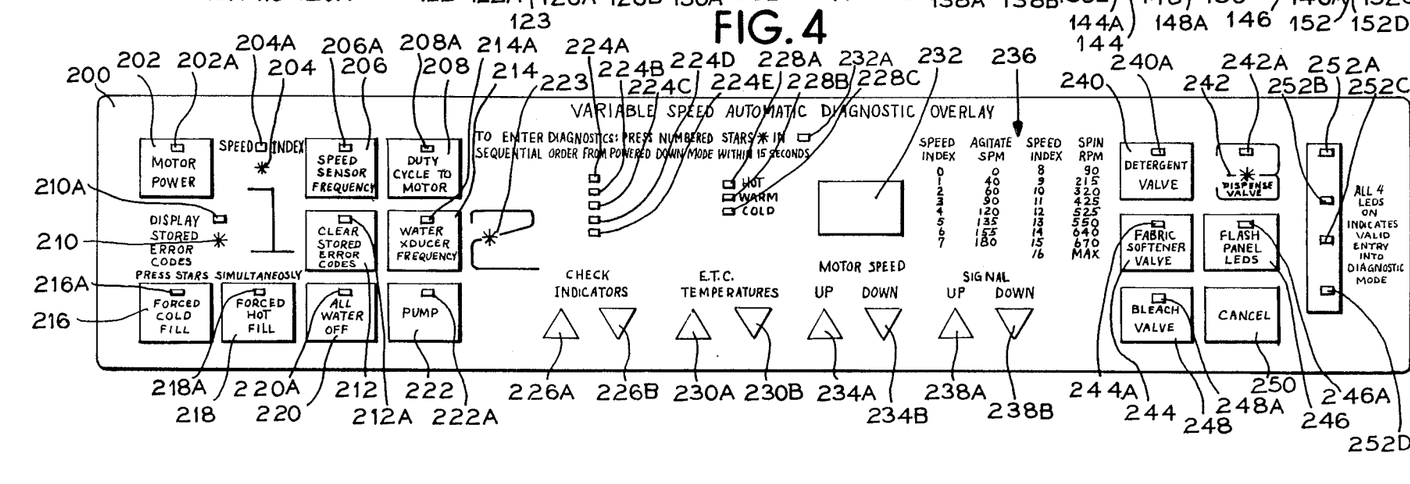
FIG. 4 is an illustration of a template utilized in connection with a diagnostic system embodying principles of the present invention.

In FIGS. 3 and 4, there is illustrated a pair of templates 100 and 200 utilized in connection with the control panel of the washer 10. The template 100 is discussed first.

The template 100 is the template that is normally employed on the control panel 21 and is utilized by a retail consumer to operate the washer 10, i.e., a person such as a retail purchaser who generally is not trained in the detailed repair and operation of the washer. The template 100 is installed in a permanent manner.

The template 100 is mounted over a plurality of switches, not illustrated. As such, the template 100 comprises a keypad. Preferably, the switches underlaying the template 100 comprise low force, low travel switches so that the template 100 comprises part of a touch keypad or touch pad. Yet further, the keypad which the template comprises, preferably is formed as a single unit on a removable circuit board so that the switches associated with the keypad are associated with a key matrix that can be coupled to the data lines of a microprocessor. Such keypad circuit boards are conventional in the relevant art.

The pads of the template 100 are divided into three sections: 100A, 100B, and 100C. Section 100A is the cycle selection section and comprises what are referred to as cycle pads. Cycle pads are employed by an end user to select washing cycles. Section 100B comprises the level control section that includes both level control pads and level indicators. An end user employs the level control pads to set various levels such as water level, water temperature, wash time, and audible signal level. Section 100C is the options, control, and status section and comprises what are referred to as option pads, control pads, and a status indicator. The option pads are employed by the end user to select additional operational features desired during a wash cycle, such as extra rinses, etc. The status indicator indicates the status of the washer 10 during a cycle. The control pads control starting, stopping, and cancellation of washer operation. These will all become more apparent below.

THE CYCLE SELECTION SECTION

In the normal state, the washer 10 is connected to an electrical power supply and the control panel 21 is "asleep." That is to say, no indicator light on the control panel 21 is lit. However, touching of any of the cycle selection pads discussed below causes the control system (described below) to apply power to the washer 10 and light the console fluorescent overhead light 21A. The last selected cycle, levels, and options, are automatically selected by the washer control and so indicated. Accordingly, a "START" light element, in this case an LED beneath window 142A, referred to as the "START" LED, will be caused to flash to prompt the user to press associated "START" pad 124 to start the washer 10.

The cycle pads do not start the washer 10, but are the only way to cause the control system to apply power and, accordingly, "wake-up" the control system of the washer 10. The pads may be touched anytime to add or change cycles before the "START" pad 142 is touched.

During the selection of cycles, levels, and options, any entries which are prohibited by the control system, are signaled with three short tones, preferably three pulses of a 500 hz signal with each pulse having a duration of 50 ms and with an interval of approximately 100 ms between pulses, via a suitable annunciator. Each valid entry is audibly signaled by means of a 50 ms/500 hz tone. Preferably, the duty cycle of the tone is 50%.

The failure to press the "START" pad 142 within 15 minutes after the last touching of one of the keypads on the template 100 causes the washer 10 to shut down and to resume its "asleep" mode.

Keypad 102 is employed to select a wash cycle for cotton and sturdy fabrics. To this end, the keypad 102 is labelled "COTTON/STURDY." Touching of the pad 102 causes the control system to select settings suited for such fabrics, and the selected wash time from last use of this cycle, the water temperature from last use of this cycle, the signal level previously set, and any options selected during previous use of this cycle. Additionally, pressing of the keypad 102 will be cause toggling of a light element beneath window 102A associated therewith. The light element beneath the window 102A preferably is a green light emitting diode. It can be appreciated however, as with all of the other selectable cycles, the selected levels, options, etc., can be changed by touching the appropriate pads.

Pad 104 is employed to select a wash cycle appropriate for sturdy permanent press fabrics. To this end, touching of the keypad 102 causes the control system to automatically select certain wash parameters appropriate for sturdier fabrics and permanent press fabrics and to allow such parameters to be altered by the user upon pressing of appropriate further level control and option keys. Accordingly, the pad 104 is appropriately labelled "STURDY/PRESS." A light element beneath window 104A associated therewith illuminates when the pad 104 is pressed. Preferably, the light element beneath the window 104A is a green LED.

Pad 106 is employed to select a wash cycle suitable for permanent press fabrics. Accordingly, the pad 106 is appropriate labelled "PERM'T PRESS." A light element beneath window 106A is toggled on or off whenever the pad 106 is pressed. The light element beneath the window 106A preferably is a green LED.

Pad 108 is employed to select a wash cycle suitable for knit fabrics. Accordingly, the pad 108 is appropriate labelled "KNIT." A light element beneath window 108A associated therewith is toggled on or off whenever the pad 108 is touched. Preferably, the light element beneath the window 108A comprises a green LED.

Pad 110 is employed to select a favorite wash cycle previously set by the user. The washer control system will automatically set itself to a cycle and levels and options last selected as the favorite wash cycle of the user. The pad 110 is appropriate labelled "FAVORITE CYCLE". A light element beneath window 110A, preferably a green LED, is toggled on or off whenever the pad 110 is pressed.

Each time that the pad "FAVORITE CYCLE" 110 is touched when the washer 10 is off, the favorite customized cycle of the user will be selected by the control system. To program this customized cycle, the pad 110 can be pressed anytime the machine is on and running the desired cycle. All selected settings will be stored as the customized cycle when the cycle is completed or if there is a power failure. If it is desired to change the settings of the user's favorite cycle, new options can be selected and these new options will be stored as the favorite cycle. The previous version of the favorite cycle will be changed and the new data will be stored. Only two of the cycles associated with the cycle pads, as discussed below, cannot be stored as favorite cycles.

Pad 112 is employed for the selection of a wash cycle suitable for delicate fabrics. Accordingly, the pad 112 is appropriate labelled "DELICATE." A light element beneath window 112A associated therewith illuminates whenever this cycle is selected. The light element beneath the window 112A preferably is a green LED.

Pad 114 is utilized to select a cycle suitable for items usually washed by hand. Accordingly, the pad 112 is appropriate labelled "HAND WASHABLE." Pressing of the pad 114 will cause toggling on or off of a light element beneath window 114A associated therewith. The light element beneath the window 114A preferably is a green LED.

Pad 116 is employed to select a presoak cycle with agitate and soak periods as well as a subsequent prewash cycle. The presoak cycle can be selected with any major cycle except "RINSE/SPIN" (discussed below) and "SPIN ONLY" (discussed below). When the presoak cycle has been selected, the presoak cycle will precede any selected major cycle and the agitation rates of the presoak cycle will match those of the major cycles of wash. The presoak cycle cannot be stored as part of a favorite cycle.

The pad 116 is appropriate labelled "PRESOAK." A light element beneath window 116A, preferably a green LED, is associated therewith and toggles on or off upon the touching of the pad 116.

Pad 118 is employed for the selection of a prewash cycle with a fill, agitate, drain, and spin. This cycle can be selected with any major cycle except "RINSE/SPIN" and "SPIN ONLY." When the prewash cycle is selected, it will preceed the major cycle and the agitating rates for the prewash cycle will match those of the wash portion of the major cycle. Time for the prewash cycle is selected to be 6.5 minutes. The default spin speed for the prewash cycle is used if no major cycle is selected. Otherwise, if a major cycle is chosen, the spin speed of the prewash cycle will match that of the wash portion of the major cycle.

The prewash cycle cannot be stored as a portion of a favorite cycle or with any other cycle. No options are retained when only the prewash cycle is selected. The audible end of cycle "EOC" signal level, discussed below, previously selected, will be used for the prewash cycle.

Whenever the prewash cycle is selected, a light element beneath window 118A is illuminated. The light element preferably is a green LED.

Pad 120 is pressed or touched to select a rinse and spin out cycle only. The washer 10 will fill, agitate, drain, and spin in this cycle. Accordingly, the pad 120 is appropriately labelled "RINSE/SPIN." Light element beneath window 120A illuminates whenever the pad 120 is pressed. Preferably, the light element beneath the window 120A is a green LED.

Pad 122 is employed to select a spin cycle only. Accordingly, the pad 122 is appropriately labelled "SPIN ONLY." In this cycle, the washer 10 will drain and spin only. This cycle can be selected while the washer 10 is in another cycle simply by touching the pad 122. Pressing of the pad 122 during a cycle will cause the previous cycle to stop and to set up the washer 10 to execute a spin only cycle. However, as with other cycles, the start pad 142 must be pressed to commence execution of the spin only cycle. A light element beneath window 122A associated with the pad 122 illuminates whenever the SPIN ONLY cycle is selected. The light element preferably is a red LED.

Pad 123 is a phantom pad and only includes an asterisk as a label. There is no audible indication when the pad 123 is pressed. This pad is used for entering the diagnostic mode, as discussed further below.

THE LEVEL CONTROL SECTION

Touch pads 126A and 126B are employed to select the water level in the washer 10 during a washing or soaking cycle. The pad 126A causes the water level selection to increment up one level. Touch pad 126B causes the selected water level selection to decrement by one level.

Associated with the keypads 126A and 126B is a display 124 that displays the selected water level. The water level ranges from high to low. As illustrated, there are five selectable water levels from high to low. Each water level selected is indicated by one of the light elements beneath the windows 124A to 124E, the level selected being indicated by a flashing light element that flashes at a one second rate. The actual water level is indicated by a light element that is continuously on. The light elements beneath the windows 124A to 124E preferably are red LEDs.

Pads 130A and 130B are employed to select the wash water temperature as regulated by means of an electronic temperature control (ETC) system. There are three selections available: cold, warm, and hot. Pad 130A is employed to select increasingly warmer temperatures, while pad 130B is utilized to select colder temperatures. An invalid entry audible tone is heard when an attempt is made to select a water temperature after the wash period agitation is over.

A display 128 associated with the pads 130A and 130B indicates the water temperature selected. To this end, the display 128 includes three light elements beneath windows 128A to 128C. Each of the light elements preferably constitutes a red LED.

Pads 134A and 134B are employed to select the desired wash time. Pad 134A is pressed to select longer wash times. Pad 134B is pressed to decrease the amount of wash time selected.

Associated with the pads 134A and 134B is a display 132 that includes a light element beneath window 132A, preferably a red LED, that is illuminated whenever a wash cycle is selected. The light element beneath the window 132A is turned off whenever the start pad 142 is pressed. Additionally, the display 132 includes a digital display beneath window 132B for displaying the selected wash time during the wash time selection. Once the start pad 142 is pressed, the digital display will display the wash time remaining until the final cycle is complete.

The wash time can be changed anytime before the agitation time has decremented to one minute. The time for all fills, drains, detergent dispenses, and transmission shifts are excluded from this timer. The timer stops during these functions. In other words, the only time to be computed for the total cycle time are the agitation and spin times.

Pads 138A and 138B are employed to increase or decrease, respectively, the sound level of the end of cycle (EOC) signal and an out of balance signal. As the pads 138A and 138B are touched, the signal is sounded at the level selected. There are five levels to choose from: off, low, medium, loud, and very loud. One pulse of the signal at the new loudness will be sounded each time a pad is touched. The selected signal level is remembered and used for every cycle until a new level is selected. Signal level selection does not wrap around, i.e., once the highest level is selected, a user must select lower levels, the control will not wrap around to the lowest level.

The EOC signal preferably is a 3000 hz signal that is emitted for eight cycles, wherein during each cycle the signal is on for 200 milliseconds and then off for 400 milliseconds. The total length in time of the EOC signal then is approximately five seconds. The duty cycle for each level is as follows:

| off | 0/22 | on time |
| low | 1/22 | on time |
| medium | 2/22 | on time |
| loud | 4/22 | on time |
| very loud | 11/22 | on time |

When used as the out-of-balance (OB) signal, the 3000 hz is sounded at the highest volume. The OB signal is sounded at a one second rate.

A visual graphic 136 illustrating a horn in schematic form including light elements 136A-136E is provided merely to inform the user of the number of possible signal level selections. Each signal level selected is indicated by sounding a tone at that signal level.

THE OPTIONS, CONTROLS, AND STATUS SECTION

Option pad 140 is employed to select the next lowest speed spin for any of the cycles. The pad 140 is appropriately labelled "LO-SPEED SPIN." If there is not a lower speed spin available, the speed will remain the same during that part of the cycle. This option may be selected at any time and will be remembered for the favorite cycle. A light element beneath window 140A associated therewith illuminates whenever this option is selected. Preferably, the light element is a green LED.

Control pad 142 is employed to start the washer 10 once all of the cycles, levels, and options have been selected, as discussed above. The pad 142 is appropriate labelled "START." The light element beneath the window 142A, preferably a green LED, illuminates whenever the start pad is pressed.

Option pad 144 is employed to select a warm rinse water temperature. Touching the pad 144 a second time turns off this option. This option may be selected anytime up until the end of the last rinse cycle agitation and will be remembered for the favorite cycle. A light element beneath window 144A, preferably a green LED, toggles on and off with pressing of the pad 144.

Control pad 146 is employed to cause the washer to enter into a hold mode and to flash the start LED beneath the window 142A at a one second rate, and illuminates a light element beneath window 146A, preferably a red LED. The pad 146 is appropriately labelled "STOP." When the pad 146 is pressed, a code comprising the letters "PS" will be displayed in the wash time digital display beneath the window 132B until the start pad 142 is pressed. The code "PS" stands for pause.

Option pad 148 is employed to add an extra rinse cycle after the normal rinse. Accordingly, the pad 148 is appropriately labelled "EXTRA RINSE." A light element beneath window 148A, preferably a green LED, toggles on and off with touching or pressing of the pad 148.

Control pad 150 is employed to stop operation of the washer 10. Upon pressing or touching of the pad 150, the selected cycle and water level will be terminated. All console lights will be turned off. Any touch to start cycle pad must be used to apply power to the washer 10. The pad 150 is appropriately labelled "CANCEL."

A display 152 is also included for indicating the status of the washer 10. To this end, the display 152 includes light elements beneath windows 152A to 152D to indicate, respectively, that the washer is in a soaking, washing, rinsing, or spinning mode. The light elements beneath windows 152A to 152C preferably are yellow LEDs. The light element beneath window 152D preferably is a red LED. In the wash/spin cycle, both the wash and spin LEDs are on. In the rinse/spin cycle, both the rinse and spin LEDs are on.

The template 200 is employed as a overlay by service personnel skilled in the repair and/or analysis of operational faults of a washer 10. The template 200 is employed to facilitate entry into the diagnostics mode and retrieve data from the control system. To this end, the template 200 includes various pads that correspond in position to the switches underneath the pads of the template 100. It can be appreciated that all of the functions that are performed with the template 200, can also be employed directly on the template 100. However, one must be aware of the alternative functions employed by the switches underlaying the pads of the template 100. Accordingly, it can be appreciated that each description of each function attributable to each pad of the template 200 is applicable to the corresponding underlying pad of the underlying template 100, when the washer 10 is in the diagnostics mode.

The template 200 is utilized to place the washer 10 in a diagnostics mode so that operational data stored by the control system can be accessed by the person servicing the washer 10. To this end, the template 200 includes certain special keypads that overlay switches beneath the template 100, that when pressed in a specified order and within a specified time, cause the control system to execute diagnostics routines. Specifically, once the template 200 has been appropriately placed on top of the template 100, pads 204 and 210 are pressed simultaneously, then pad 223 is pressed, and finally pad 242 is pressed. The sequence is illustrated by the numerals 1, 2, and 3 on the template 200. It can be appreciated that pad 204 overlays the "STURDY PRESS" pad 104, while pad 210 overlays the "FAVORITE CYCLE" pad 110. Similarly, pad 223 overlays the phantom pad 123, while the pad 242 overlays the "START" pad 142.

The diagnostics mode is entered after the washer 10 has been powered down. That is to say, the diagnostics mode is entered after the washer 10 has completed its operation. If the pads 204, 210, 223, and 242 are appropriately pressed within 15 seconds, the control system will execute the diagnostics mode program and a successful entry into the diagnostics mode will be indicated by the simultaneous illumination of all of the light elements beneath the windows 152A to 152D through the overlying windows 252A to 252D.

As will become more apparent, the template 200 includes windows through which the various LEDs underlying the various windows of the template 100 illuminate. Accordingly, it should be understood that in the following description, reference to an underlying light emitting element refers to the LEDs underlying the template 100 and that reference to illumination of a light emitting element through a window of the template 200 by consequence requires illumination through a respective window of the template 100.

Upon entering the diagnostics mode, the default status of the control panel is as follows: the "FAVORITE CYCLE" LED beneath the window 110A is on (and can be seen through window 210A), the lamp/master relay (illustrated on FIGS. 7A–7C, and described in connection therewith) is on, all four of the status LEDs under the windows 252A to 252D are on, and the digital display under the window 132B displays a motor speed index of 7, the highest agitate speed. Upon the depression of the pad 234A, the control system will call for motor speed 15, the highest spin speed for the basket.

All of the LEDs beneath the windows 252A to 252D remain lit during the duration of the diagnostics mode. Furthermore, while the washer 10 is in the diagnostics mode, the keypad switches associated with the pads are able to control any function of the washer 10 by toggling the function on or off whenever the appropriate pad is pressed.

As a special adaptation of the diagnostics mode, the mode may be used as a high speed automated test by bypassing the debouncing of the pads and using a debounced input from relevant test equipment. If the diagnostics mode entry start up sequence is completed within one second, then debouncing will be bypassed and test equipment inputs will be used by the system.

Pad 202 is employed to toggle the relay of the motor 34 and to toggle the light emitting diode under the window 102A. Pad 202 is appropriately labelled "MOTOR POWER." A window 202A associated with the pad 202 is provided for illumination therethrough of the LED associated therewith.

Pad 204 is employed to display the motor speed index on the digital display through the window 232 and is labelled "SPEED INDEX."

Pressing of the pad 204 also causes illumination of the LED under the window 104A through the window 204A associated with the pad 204. Additionally, the LEDs beneath the windows 206A, 208A, 210A, and 214A are turned off upon pressing of the pad 204.

A chart 236 is conveniently positioned adjacent to the window 232 so that one can interpret a speed index displayed therethrough. As can be discerned from the chart, in the preferred embodiment, an index from 0 to 7 corresponds to a particular agitation rate specified in spins per minute (SPM). An index from 8 to 16 corresponds to a particular spin rate specified in revolutions per minute (RPM). Thus, at a glance, one can determine whether the motor 32 is being requested to cause the agitator 30 to agitate or the basket 28 to spin and the rate at which the task called for will be undertaken.

Pad 206 is employed to cause display of the frequency in window 232A with LED132A being illuminated if frequency is greater than 100, being read from the Hall effect sensor and is labelled "SPEED SENSOR FREQUENCY." Pressing of the pad 206 causes the LED beneath the window 206A to illuminate and the LEDs associated with the favorite cycle, sturdy press, knits, and hand washable pads to turn off. The frequency is displayed numerically on the digital display underneath the window 232. The frequency is determined by reading hall effect sensor, not illustrated, and an eight pole magnet on the shaft of motor 34.

Pad 208 is employed to cause display of the duty cycle being sent to the motor control (the number of ½ ms pulses being sent out of 128 possible pulses) on the digital display beneath the window 232 and, accordingly, is labelled "DUTY CYCLE TO MOTOR." Additionally, pressing of the pad 208 causes the LED associated with the window 208A to illuminate. The light elements associated with the pads 204, 206, 210, and 214 are turned off upon selection of this function.

Pad 210 is used to cause the control system to display error codes on the digital display beneath the window 232 and to turn on the light element associated with the window 210A. At the same time, pressing of the pad 210 causes the light elements associated with the pads 204, 206, 208, and 214 to turn off. The error codes that can be displayed are discussed below under the headings "SERVICE PERSONNEL CODES." Pad 210 is appropriately labelled "DISPLAY STORED ERROR CODES."

Pad 212 is used to clear any stored error codes that generally are retrieved only by service personnel employing the diagnostics routines and is labelled "CLEAR STORED ERROR CODES." Pressing of pad 212 causes toggling of the LED associated with the window 212A.

Pad 214 is employed to cause the digital display to display a reading of the frequency of the water level transducer and to turn on the LED associated with the window A. The light elements for windows 204A, 206A, 210A, and A are turned off. Pad 214 is labelled "WATER XDUCER FREQUENCY."

Preferably, the frequencies of the water level transducer correlate to specific water levels as illustrated in Table I below:

TABLE I

| Water Fill Levels and Basket | Transducer Frequency |
|---|---|
| 4 in. minimum sensed (2–5.6 inches) | 148 Hz |
| 7.5 in. minimum (5.8–8 inches) | 152 Hz |
| 9.0 in. (8.3–9.9 inches) | 156 Hz |
| 10.5 in. (10.2–11.3 inches) | 160 Hz |
| 12.5 in. (11.9–12.7 inches) | 165 Hz |
| 14 in. maximum (14.2–15.8 inches) | 171 Hz |

At 16.4 inches, a mechanical switch turns power off to the water inlet valves so as to preclude overfilling of the basket.

In connection with the foregoing, it can be appreciated that the water level control system is designed so as to be accurate within plus or minus 1.7 Hz. A hysteresis of 1 Hz is provided so that the digital display associated with the window 232 will not flicker and be confusing and so that actuation of the water valves will not be annoying. The water level readings preferably are averaged over a 5 second period before any decision is made by the control system as to what numeral/numerals to display. The digital display will indicate the set water level when it has been reached only after the basket 28 has stopped rotating. The digital display will not decrement to the next lower reading until it is at least 2 Hz below the set point.

Further, inasmuch as the digital display employed in the preferred embodiment only utilizes two digits, only the least two significant digits of the frequency read out from the water level transducer are displayed. The LED below window 232A is illuminated to display the hundreds digit.

Pressing of the pad 216 effects a forced cold water fill and to cause the LED beneath window 216A to turn on and the LEDs associated with the windows 220A and the indicator 228 to turn off. This means that the electronic temperature control is not employed to control the temperature of the water. Instead, water from the cold water inlet is caused to fill the basket regardless of this temperature. Pad 216 is labelled "FORCED COLD FILL."

Pad 218 is employed in a manner similar to the pad 216, however, it is used to cause the forced filling of the basket with hot water, i.e., a forced hot fill. Selecting this feature causes the light element associated with the window 218A to illuminate and the light elements associated with the water temperature indicator 228 and window 220A to turn off.

Pad 220 is employed to turn off the supply of all water to the washer 10 and the light elements for the wash water temperature indicator 228 and the light elements associated with the windows 216A and 218A. Selection of the all water off feature causes the light element associated with the window 220A to illuminate. Pad 220 is labelled "ALL WATER OFF."

Pad 222 is employed to toggle the relay associated with the pump 34 so as to cause the pump 34 to turn on and off. Additionally, pressing of the pad 222 toggles the light element associated with window 222A to toggle on and off. Pad 222 is labelled "PUMP."

Pads 226A and 226B are employed to cause the various light elements associated with the water level indicator 224 to illuminate through the windows 224A–224E. Pad 226A is employed to cause the light elements to light in sequence from the window 224E to the window 224A. Conversely, pad 226B is employed to cause the light elements to illuminate in the opposite sequence in the direction from the window 224A to the window 224E. Accordingly, the pads 226A and 226B are employed to check the light elements of the indicator 224.

Pads 230A and 230B are utilized in connection with the indicator 228 to cause illumination of the light elements associated with the electronic temperature control (ETC) and windows 228A–228C in opposite directions and to cause the control system to deliver the indicated automatic washer electronic temperature control temperature. Accordingly, employment of the pads 230A and 230B will cause the control system to select electronic temperature control over the temperature of the wash water, thereby regulating same. This function must be turned off by means of pressing the pad 220.

Pads 234A and 234B are employed to request greater or lesser motor speeds as indicated in the chart 236 located adjacent to the window 232. Pressing of the pad 234A will cause selection of a greater index number. Conversely, pressing of the pad 238B will cause selection of a lower index number.

Pad 240 is employed to toggle the detergent valve between open and closed positions and to toggle the light element associated with the window 240A concurrently therewith. Pad 240 is appropriately labelled "DETERGENT VALVE."

Pad 242 is employed to toggle the dispense valve between open and closed positions and to toggle the light element associated with the window 242A concurrently therewith. The pad 242 is appropriately labelled "DISPENSE VALVE."

Pad 244 is employed to toggle the fabric softener valve between open and closed positions and to toggle the light element associated with window 244A concurrently therewith. The pad 244 is labelled "FABRIC SOFTENER VALVE."

Pad 246, when pressed, toggles the lamp/master relays and the light elements associated with the window 246A. Pad 246 is appropriately labelled "FLASH PANEL LEDS" as all of the light elements of the panel will be caused to toggle on and off.

Pad 248 is employed to toggle the bleach valve between open and closed positions and the light element associated with the window 248A concurrently therewith. Pad 248 is appropriate labelled "BLEACH VALVE."

Pad 250 is employed to cancel operation of the diagnostic mode and to cause the washer 10 to assume its normal state. All diagnostics are terminated upon pressing of the pad 250. Accordingly, the pad 250 is appropriately labelled "CANCEL."

ERROR/STATUS CODES

During the normal operation of the washer 10, a variety of codes, referred to as diagnostic indicators, may appear on the digital display underneath the window 132B. One set, referred to as status indicators or status codes, are for the user of the washer 10. The status codes are codes that the user will see in the digital display of the washer 10 at different times during its operation. Some of these indicators or codes are warnings that something is wrong with the washer 10 while others are just helpful reminders of the operational status of the washer 10.

A second set of indicators, referred to as service personnel diagnostic indicators are for viewing by service personnel skilled in the repair and service of the washer 10. This second set of indicators or codes are stored away for later retrieval by service personnel when something is wrong with the washer 10 that the user may not be able to fix or correct. Any time this is the case, it is expected that the user, upon recognizing the display of the code "CS" on the digital display, which code stands for "call service," the user will call for the services of the skilled repair personnel. The actual problem indicating code or indicator is stored in memory for the service personnel to recall by placing the washer 10 in its diagnostic mode through the sequence of keypad entries discussed above. Below is a short description of each of the presently preferred indicators or codes that can be displayed on the digital display.

The presently preferred codes for indicating the status of the washer 10 are eight in number. These codes are: "ob," "PF," "OL," "PS," "CF," "CH," "LP," and "CS."

The out-of-balance indicator "ob" indicates that the washer 10 is out-of-balance. This code will flash alternatively with the time remaining on the digital display until the lid has been opened. If the out-of-balance condition is severe enough, the basket of the washer 10 will stop spinning and the end of cycle signal will be sounded to alert the user.

Three openings of an out-of-balance switch within 15 seconds will be considered an out-of-balance condition. Each time an out-of-balance condition is detected, the control system will make a modification (reduction) to the speed of the motor. Any detection of an out-of-balance condition after the calling for of the motor speed of 90 RPM will result in the control system entering the stop mode with "ob" alternatively flashing in the digital display with the time remaining at a one second rate and the end of cycle signal sounding at once every second, at the highest volume level, until the control system recognizes either a transition of the lid switch followed by a depression of the "START" pad 142, or a depression of the "CANCEL" pad 150.

The occurrence of a power failure is indicated by the code "PF." This occurs when there is a sufficient interruption in the supply of electrical power to the washer 10 during the operation of a washing machine cycle. The code "PF" is displayed on the digital display whenever a touch-to-start cycle pad is pressed after power is reapplied. This code will flash at a one second rate until a second pad is pressed. If the washer 10 was running or in operation during the power failure, all selected options will have been saved for that cycle as if the cycle had been completed.

Whenever the washer 10 is in a spin portion of a cycle and the lid is opened, the indicator "OL" will be displayed. This code stands for "OPEN LID." The code will stay displayed on the digital display until the lid is shut. This code will not flash. Further, this code will only be displayed when the lid being opened causes the washer 10 to become inoperable.

Whenever the user pushes or presses the "STOP" pad 146, the digital display will indicate a code "PS," this code standing for "pause." This code will be displayed in a non-flashing manner until the "START" pad 142 is pressed to cause resumption in the operation of the washer 10.

Any time a fill requires more than 15 minutes to satisfy the requested water level, the digital display will flash the code "CF" alternately with the total cycle time remaining at a one second rate while the washer 10 continues to fill. The code "CF" stands for "check fill." Once the water level has been satisfied, the control system will cause the code to not be displayed.

Any time a drain of the liquid in the washer occurs, the control system will check for changes in the water transducer frequency every 30 seconds. If there is not at least a 2 Hz decrement in the transducer frequency read out between any two consecutive checks, then the control system will cause the code "CH" to be displayed. The code "CH" stands for "check hose." This is an indication that something may be wrong with the drain hose. When this code is displayed, the control system will add time to the final two minutes of the pump out portion to allow for a slow pump out of the water.

As long as there is some decrement in the frequency, but less than 2 Hz, then the code "CH" will flash alternately with the total cycle time at a one second rate while the washer 10 continues to run. However, there is an additional 30 seconds, for each period in which there is less than a 2 Hz change, at the end of the drain portion for the water to exit the basket before the spin portion of a cycle begins.

If there is no change in frequency between any two checks of the water level transducer and the frequency is greater than 146 Hz, then the display will flash the code "LP" at a one second rate by itself and the washer 10 will be put in the stop mode. The end of cycle signal will be sounded at a rate of once per second. This will continue until the user resets the washer 10 by pressing the "START" pad 142. "LP" stands for "locked pump." Upon the sixth detection of this locked pump condition, the control system will cause the display of the code "CS" and the storing of the code "dn" (discussed below) for later recall by service personnel.

As discussed above, the code "CS" stands for "call service" and is displayed whenever there is a drastic error with the washer 10 such as the lack of a Hall effect response or the lack of drainage. In either case, the washer 10 will remain operable but the control system will flash the "CS" code at a one second rate alternately with the total cycle time remaining as long as the error condition persists. The condition or conditions that stimulated the display of the "CS" code will be remembered in a memory so that service personnel can recall them. Resetting of the control system by means of the "CANCEL" pad 150 or a power failure will clear the flashing "CS" code but will not erase the service personnel memory.

SERVICE PERSONNEL DISPLAY CODES

Service personnel will be able to recall any diagnostic display code associated with an error resulting in the display of a "CS" code by entering the diagnostics mode as described above. After entering the diagnostics mode, pressing of the "FAVORITE CYCLE" pad 110 or the "DISPLAY STORED ERROR CODES" pad 210, will cause the display of any error codes stored in the memory. All service personnel display codes will flash alternately at a one second rate. Pressing of the "DELICATE" pad 112 or the "CLEAR STORED ERROR CODES" pad 212 will cause all service personnel codes to be cleared from the memory. If no service personnel display codes exist in memory, then pressing of the "FAVORITE CYCLE" pad 110 or the "DISPLAY STORED ERROR CODES" pad 212 will only cause the display of "00."

The code "dn" stands for drain. This code is stored for later recall by service personnel when the control system has determined that there is no apparent decrement in the water level transducer frequency in a drain condition as described above in connection with the description of the code "LP."

The other service personnel display code is "SS" which stands for "speed sensor." This code is remembered for service personnel when the control system has determined that there is a problem with either the motor, the motor control, or the Hall effect speed sensor The code is stored anytime the control system requests for a motor operation and less than one transition from the speed sensor is detected in a 30 second period. In addition, the control system must not request any speed above the base speed during any absence of the speed signal Anytime the speed signal reappears, the control system will clear the "SS" code from memory and stop flashing the "CS" code in the display. At that time, regulation of motor speed should resume as normal.

CODE STORAGE AND RETRIEVAL ROUTINES

Figure 5:
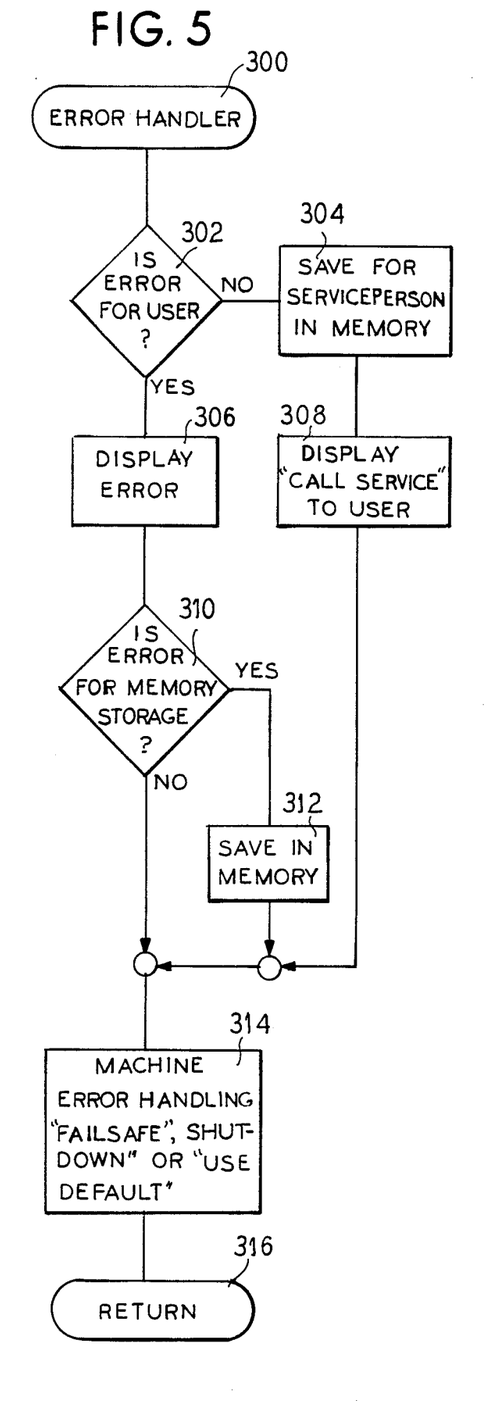
FIG. 5 is a flow chart illustrating a data storage algorithm utilized in a diagnostic system embodying principles of the invention.

In FIG. 5 there is illustrated a flow diagram of a routine or algorithm employed in the control system of the washer 10 for determining whether and how to store a code concerning the occurrence of an operational fault or error. The routine is executed by the control system when requested to do so by apparatus associated with sensors and the like detecting the occurrence of an error.

To this end, the execution of the routine preferably is requested on an interrupt basis by appropriate electronic devices coupled to an appropriate processor. The routine preferably is implemented by means of a computer program called an error handler.

In step 300, execution of the routine is commenced. This can occur when the supervisory routine controlling the operation of the washing machine detects an error. At this time, the supervisory routine directs the processor to execute the error handler routine.

In the illustrated step 302 of the routine, the processor or control system identifies whether the fault or error is a major error requiring the attention of a skilled repair person or a minor error that can be attended to by the retail user of the washer 10. If the error is a minor error, then the processor proceeds to step 306 and causes the display of an appropriate error code for visual inspection by the user. If the error is a major error, then error data is stored in a memory for later retrieval via the diagnostics mode routine, which is generally invoked by skilled repair personnel.

Major errors are those that are predetermined within the design of the control system to be those that will probably require a service person skilled in the art of washing machine repair. These errors include "speed sensor" or "locked pump." Errors such as a power failure will not require any attention and are stored strictly to inform the user why the cycle was not completed.

Errors for which data is stored in step 304 include "power failure", "speed sensor", and "locked pump" (after 6 detections of no water level change in drain mode).

Once the error data has been stored in accordance with step 304, the control system in step 308 causes the "call service" code letters of "CS" to be displayed on the digital display beneath the window 132B. The user is supposed to interpret the code and then take appropriate action such as calling the service personnel to correct the cause of the fault.

If the error is determined to be a user error in accordance with step 302, an appropriate error code is displayed on the digital display in accordance with step 306, and then the control system proceeds to step 310 to determine if the error is such that error data is still to be stored for later retrieval.

Conditions that happen during normal washer operations that in the error handler routine, but which are not stored in memory include "Open Lid" (during a spin operation) and "Pause". Errors that are not stored include "Check Fill" (water unit valves), "Check Hose" (drain), "Locked Pump" (prior to sixth detection of no change in water level), and "Out of Balance."

Data concerning a power failure error, however, is stored. Accordingly, in step 312, "power failure" error data is stored in memory.

If the error is such that data, such as a code is to be stored, then the system proceeds to step 312 and stores the code data. Following such storage or if no such storage is to take place, the system proceeds to step 314, wherein the washer is placed in one of three modes: "FAIL SAFE," "SHUT DOWN," "TEMPORARY SHUT DOWN," or "USE DEFAULT."

The "SHUT DOWN" mode is selected whenever a power failure error or uncorrectable out of balance condition occurs. Operation of the washer is terminated.

The "FAILSAFE" mode is selected whenever a "locked pump", "check hose", or "check fill" error is detected. The washer continues to attempt operation and the respective mechanism such as the pump, drain and water input continue to function.

The "TEMPORARY SHUT DOWN" mode is selected whenever an "open lid" or "pause" error condition is detected. In this mode, the washer can be operated once the condition is corrected by the user. For example, the user may need only close the lid or terminate the pause condition.

The "USE DEFAULT" mode is selected whenever a speed sensor error is detected. The pre-programmed duty cycle to the motor, used before the motor 32 has begun operation, is output to the motor speed control.

In step 316, processing by the error handler is terminated and the control system continues normal monitoring operation.

Figure 6:
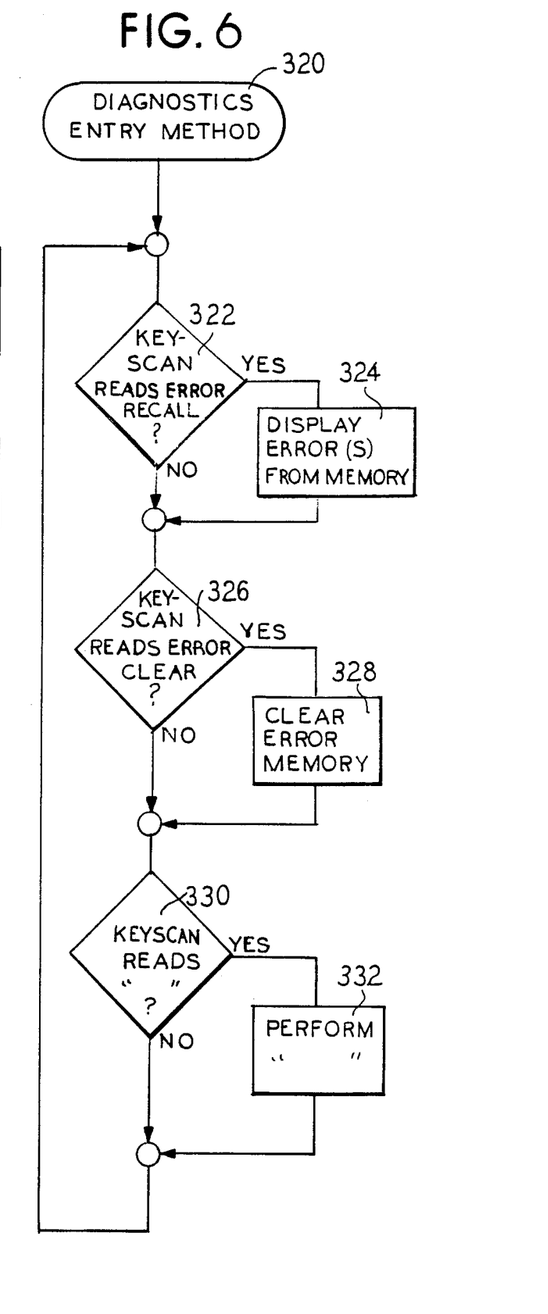
FIG. 6 is a flow chart illustrating a data retrieval algorithm utilized in a diagnostic system embodying principles of the invention.

In FIG. 6 there is illustrated in flow diagram form, a routine or algorithm for retrieving stored error codes, for clearing the error code memory, and for initiating the performance of any of the functions designated by the pads on the template 200. It is assumed, as illustrated by the block 320, that successful entry into the diagnostics mode has taken place. To this end, the block 320 generally represents successful completion of the required key sequence for entry into the diagnostics mode, discussed above.

Following entry into the diagnostics mode, the control system, namely the central processor, causes the system to perform at least three scanning steps. In step 322, a determination is made as to whether or not a scanning of the keypad beneath the templates 100 and 200 detects pressing of the pad for requesting recall of the error codes, namely the pad 210, and correspondingly, the pad 110. If the switch beneath the pad 110 or the pad 210 is activated, then the control system interprets this as a request for the display of the error codes and accordingly, proceeds to step 324 wherein appropriate sub-routines are invoked to cause the display of the error codes as discussed above.

If a scan of the keypad does not indicate a request for a recall of the error codes, or upon completion of the display of the error codes, the control system advances to step 326, wherein it is determined whether or not a scan of the keypad indicates that there has been a request for a clearing of the error codes. If the control system determines that there has been a request for a clearing of the error codes, i.e., pressing of the pad 212 or the pad 112, then the control system advances to step 328.

In step 328, appropriate sub-routines are invoked to clear the display of the error codes and to clear the memory holding such memory codes.

If in step 326 the control system determines that there has been no request for clearing of the error codes, and upon completion of the step 328, the control system advances to step 330. At step 330, the control system identifies the pressing of particular pads and identifies the keypad code associated with such pressing. If a pad is pressed, then the control system proceeds to step 332, wherein appropriate sub-routines are invoked for executing the function associated with pressing of the particular pad that has been pressed. If no keypad is pressed and following invocation of the particular sub-routines in accordance with step 332, the control system loops back to the beginning of this routine to step 322 and again commences scanning the keypad for identification of pads that are pressed.

It can be appreciated that the foregoing routine essentially is a continuous loop. However, it can also be appreciated that one of the pads is the CANCEL pad 250 or the CANCEL pad 150 which, by hardware means, will remove electrical power to the microprocessor causing execution of the diagnostics mode to desist.

WASHER ELECTRICAL SYSTEM

Figure 8:
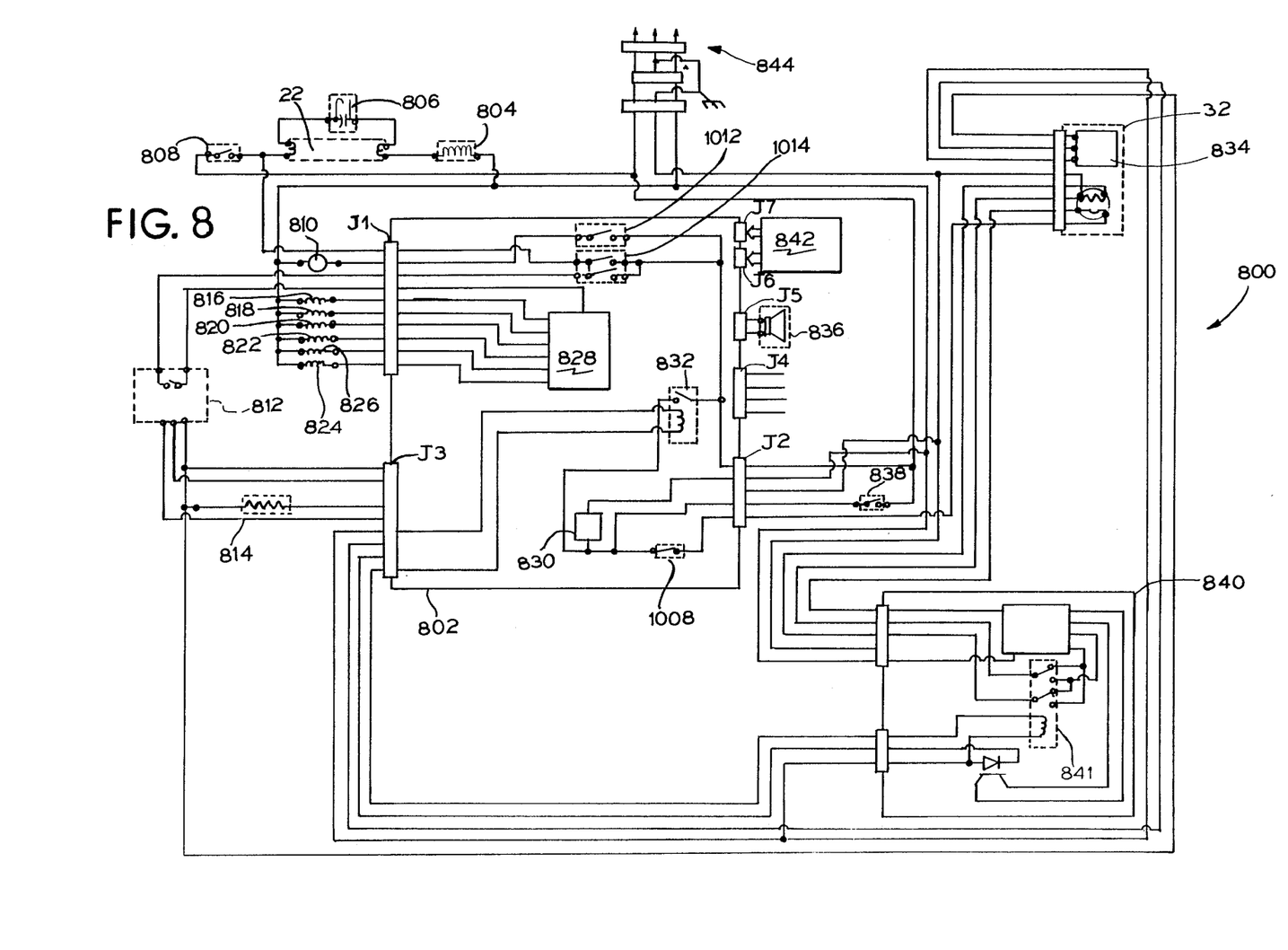
FIG. 8 is a schematic layout diagram of an electrical system employing the circuit of FIGS. 7a–7c.

In FIG. 8 there is illustrated a layout schematic for the electrical components of the washer 10. The general interaction of the various valves, the motor 32, the key pads, etc. is illustrated.

Generally, an electrical system 800 includes a microprocessor based control system 802 that controls and operates various other components. It can readily be appreciated by those skilled in the art how the control system 802 serves to receive and distribute electrical signals to operate the various valves and other components coupled thereto.

Figure 7A:
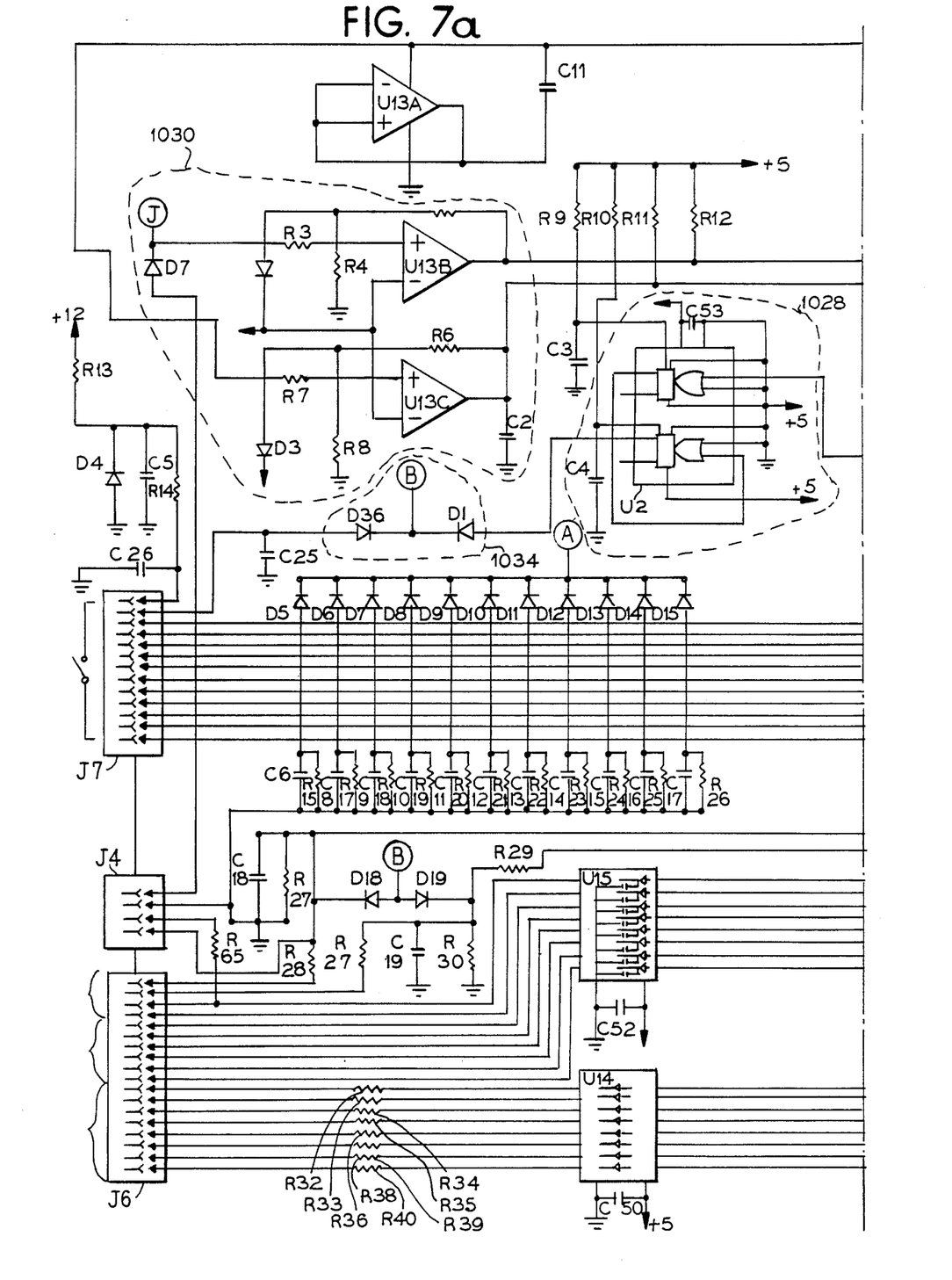
FIGS. 7a–7c are a schematic layout diagram of an electronic circuit utilized to execute a diagnostic system employing principles of the present invention.
Figure 7B:
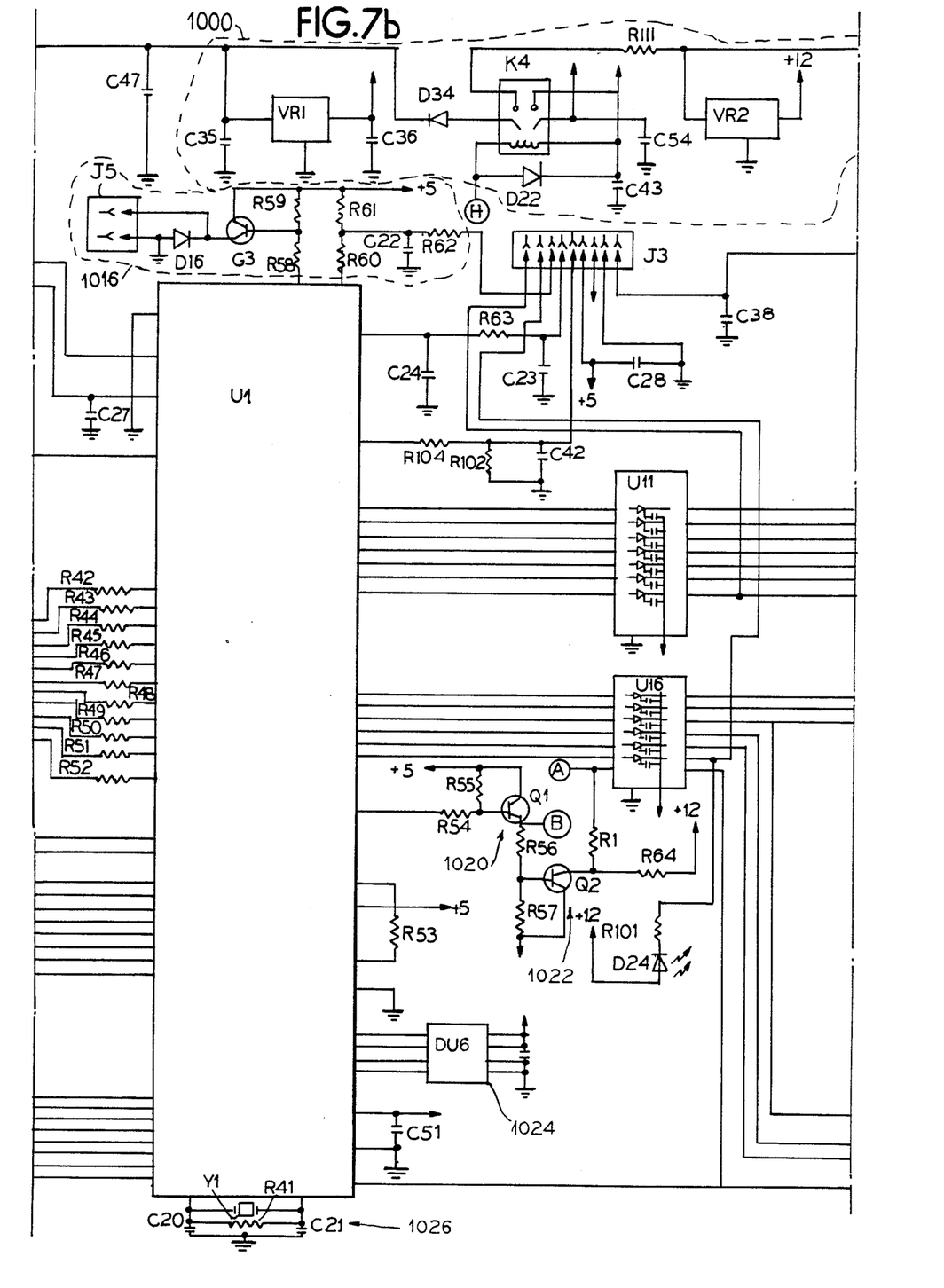
Figure 7C:
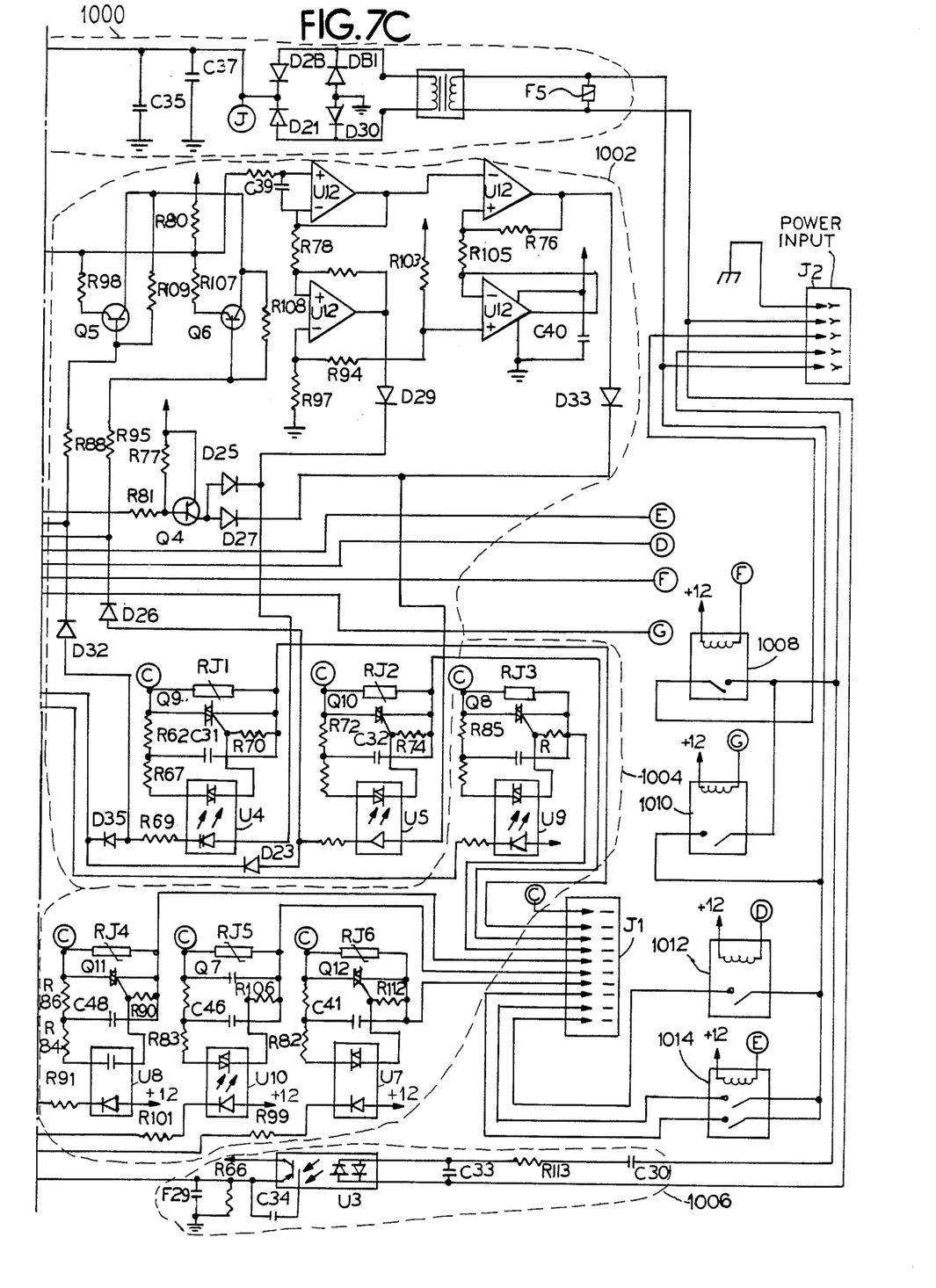

For a more complete understanding of the layout in FIG. 8, reference should be made simultaneously to FIGS. 7a-7c wherein the control system 802 is illustrated in greater detail. The accompanying description set forth below describes components common to all of the figures.

The following is a list of some of the components illustrated in FIG. 8 for which no further description is provided. This list is provided merely for completeness of understanding of the layout. Particular knowledge concerning these items is not necessary for practicing the invention under further description is provided.

| Reference No. | Description |
| --- | --- |
| 800 | Overall electrical system |
| 802 | Control system |
| 804 | Ballast for flourescent light 22 |
| 806 | Starter for flourescent light 22 |
| 808 | Switch for flourescent light 22 |
| 810 | Washer drain pump |
| 812 | Water level switch |
| 814 | Thermistor |
| 816 | Bleach dispensing valve |
| 818 | Dispensing valve |
| 820 | FS valve |
| 822 | DET valve |
| 824 | Hot water valve |
| 826 | Cold water valve |
| 828 | Triacs for operating valve soleniods |
| 830 | Open lid detection switch |
| 832 | Spin lid bypass switch |
| 834 | Hall effect speed sensor |
| 836 | Audible signal speaker |
| 838 | Lid switch |
| 840 | Control circuit for controlling |

4,977,394

-continued

| Reference No. | Description |
|---|---|
| | motor 32 |
| 841 | Motor reversing relay |
| 842 | Key pad assembly board |
| 844 | Power input connectors |
| 1008 | Motor master relay |
| 1012 | Pump relay |
| 1014 | Lamp and valve relay |

J1–J7 are connectors that are more fully described below.

CONTROL SYSTEM ELECTRONICS

In FIGS. 7a–7c, there is illustrated a circuit layout of the control system of the washer 10. The control system is employed to execute the routines illustrated in FIGS. 5 and 6 and to effect the functions associated with the pads of the template 100 and 200, as described above. Those skilled in the relevant technology can easily comprehend the preferred embodiment from the figures.

As should be immediately apparent, the control system is a microprocessor based electronic circuit that includes a microprocessor U1. In the preferred embodiment, the microprocessor U1 is marketed under the designation HD63B05Y0 C51 by Hitachi Corporation. Such microprocessor has 55 input/output lines and a serial communications interface. The microprocessor is based on CMOS technology. Further information relevant to this and other components described herein can be obtained from IC Master, Volumes 1 and 2, published in 1987 by Hearst Business Communications, Inc., and the updates thereto.

The various components of the circuit arrangement illustrated in FIGS. 7a–7c and FIG. 8 should be readily understood and appreciated by those skilled in the relevant art. The specifically preferred components are listed in the table below wherein reference alphanumerics in the drawings are correlated to a short description and a part number by which such component or components is or are known to those in the relevant art.

| Reference Alphanumeric | Description | Part No. |
|---|---|---|
| U1 | IC MICROPROCESSOR, MASKED | HD63B05Y0 C51 |
| U15 | IC SOURCE DRIVER 8W | UDN2981A |
| U14 | IC SINK DRIVER 8W | UDN2595A |
| U11, 16 | IC SOURCE DRIVER | ULM2003A |
| U13 | IC QUAD COMPARATOR | LM339N |
| U12 | IC QUAD OP AMP | LM324N |
| U2 | IC DUAL MONO MULTIVIB | MC14538BCP |
| VR1 | IC VOLTAGE REG 5V | MC7805CT |
| VR2 | IC VOLTAGE REG 12V | MC7812CT |
| U3 | IC OPTOCOUPLER | H11AA1 |
| U4, 5, 9, 8, 10, 7 | IC OPTOCOUPLED TRIAC | MOC3011 |
| DU6 | IC EEPROM | NMC9306N |
| Q2 | TRANSISTOR NPN SWITCH | MPS2222 |
| Q3 | TRANSISTOR PNP SWITCH | MPSA56 |
| Q1, 4, 5, 6 | TRANSISTOR PNP SWITCH | MPS2907 |
| Q7, 8, 9, 10, 11, 12 | TRIAC 0.6A 400V | MAC97A6 |
| D15, 14, 13, 12, | DIODE SWITCHING | IN4148 |

-continued

| Reference Alphanumeric | Description | Part No. |
|---|---|---|
| 11, 10, 9, 8, 7, 6, 5, 20, 2, 1, 3, 36, 35, 23, 26, 32, 25, 27, 29, 33, 18, 19, 16 | | |
| D17, 34, 22, 28, 31, 21, 30 | DIODE 1A 200 PIV | IN4003 |
| D4 | DIODE ZNR 4.3V 5% 500 MW | IN5229B |
| RV7 | MOV | ERZC20DK2010 |
| RV1, 2, 6, 3, 4, 5 | MOV | ERZC14DK241U ECV250NR14-3 |
| D24 | LED RED AXIAL D0-35 | LN2G-(TA) |
| Y1 | RESONATOR CER 8 MHZ+–.5% | KBR8.0M |
| C20, 21 | CAP 22 PF 50V 5% CER | 592CCOG220J050B |
| C18, 19 | CAP .001 UF 10% 50V X7R | 592CX7R102K050B |
| C17, 16, 15, 14, 13, 12, 11, 10, 9, 8, 6, 53, 52, 38, 39, 40, 22, 24, 28, 24, 34 | CAP .01 UF 100V X7R CER | C410C103M1R5CA |
| C1, 5, 25, 26, 27, 33, 44, 45, 47, 51, 54 | CAP .1 UF 50V Z5U CER | SA205E104ZAA |
| C3, C4, C29 | CAP 1 UF 20% 50V AL ELE UC | SM50VB1M5X11MT |
| C43 | CAP 10 UF 20% 35V AL EL UCC | SM35VB10M5X11MT |
| C2 | CAP 22 UF 20% 25V AL EL UCC | SM25VB22M5X11MT |
| C36, 50 | CAP 47 UF 20% 16V AL EL UCC | SM16VB47M6.3X11MT |
| C35, 37 | CAP 2200 UF 20% 35V ALE UCC | SM35VB222M18X35.5CC |
| C23 | CAP .047 UF 10% 50V MLR | ECQ-M1H473KZB |
| C31, 32, 49, 48, 46, 41 | CAP .1 UF 400V MET MYLR | ECQ-E4104KZ |
| C30 | CAP .56 UF 250VAC MLR | ECQ-EE2A564MW |
| R14 | RESISTOR 100 OHM ¼W 5% | CF |
| R67, 71, 87, 84, 83, 82 | RESISTOR 180 OHM ¼ W 5% CF | CF |
| R32, 33, 34, 35, 36, 38, 39, 40, 62 | RESISTOR 220 OHM ¼W 5% | CF |
| R73, R69 | RESISTOR 560 OHM ¼W 5% CF | CF |
| R110, 89, 91, 101, 99 | RESISTOR 820 OHM ¼W 5% CF | CF |
| R13 | RESISTOR 1K ¼W 5% CF | CF |
| R68, 72, 85, 86, 100, 75 | RESISTOR 2.7K ¼ W 5% CF | CF |
| R53, 1, 56 | RESISTOR 4.7K ¼ W 5% CF | CF |
| R12 | RESISTOR 5.1K ¼ W 5% CF | CF |
| R7, 58, 79, 54, 64, 81 | RESISTOR 6.2K ¼ W 5% CF | CF |
| R4, 8, 70, 74, 109, 88, 95, 108, 96, 93, 90, 106, 112, 27, 30, 61, 63, 104, 66 | RESISTOR 10K ¼ W 5% CF | CF |
| R11 | RESISTOR 11K ¼ W 5% CF | CF |
| R3 | RESISTOR 12K ¼ W 5% CF | CF |
| R65, 28, 31 | RESISTOR 15K ¼ W 5% CF | CF |
| R77, 59, 55, 57 | RESISTOR 22K ¼ W 5% CF | CF |
| R2 | RESISTOR 27K ¼ | CF |

-continued

| Reference Alphanumeric | Description | Part No. |
|---|---|---|
| R6 | RESISTOR 51K ¼ W 5% CF | CF |
| R9 | RESISTOR 82K ¼ W 5% CF | CF |
| R26, 25, 24, 23, 22, 21, 20, 19, 18, 17, 15, 10, 78, 76, 43, 42, 44, 45, 46, 47, 48, 49, 50, 51, 52, 37, 29, 60 | RESISTOR 100K ¼ W 5% CF | CF |
| R41 | RESISTOR 1M ¼ W 5% CF | CF |
| R102 | RESISTOR 4.3K ¼W 5% CF | CF |
| R114 | RESISTOR 4.7M ¼ W 5% CF | CF |
| R94 | RESISTOR 5.11K ¼W 1% M | RN55D 50PPM |
| R92, R105 | RESISTOR 5.49K ¼ W 1% MF | RN55D 50PPM |
| R107 | RESISTOR 19.6K ¼W 1% MF | RN55D 50PPM |
| R98 | RESISTOR 39.2K ¼ W 1% MF | RN55D 50PPM |
| R97, 103 | RESISTOR 47.5K ¼W 1% MF | RN55D 50PPM |
| R80 | RESISTOR 64.9K ¼ W 1% MF | RN55D 50PPM |
| R111 | RESISTOR 22 OHM ¼W 5% CF | CF |
| R113 | RESISTOR 750 OHM 1W 5% CF | CF |
| K4, 3 | RELAY 2FRM A 5A 12VDC OMRON SEALED | G2R2214P-V-US |
| K2, 5, 2 | RELAY MIN 1 FORM A 10A OMRON SEALED | G6C-1114P-US |
|  | TRANSFORMER PC MT 10VA MULTIPRODUCTS | 4555-10-016 |

A power supply 1000 is shown in FIGS. 7B and 7C. The electronic water temperature control (ETC) 1002 is provided to maintain a selected water temperature as selected by user input through the water temperature selector pads 130A and 130B. A dispenser control 1004 is provided to appropriately control various dispensers such as detergent dispensers, bleach dispensers and rinse additive dispensers. Lid switch detector circuitry 1006 is provided to send appropriate signals upon detection of an open lid condition in order to terminate motor operation.

Various relays are also provided such as relay 1008 which is a motor master relay, relay 1010 which is a lid bypass relay, relay 1012 which is a pump relay and relay 1014 which is a valve and light relay. An output circuit 1016 is provided for controlling an external speaker. The microprocessor U1 provides the controlling of the various functions of the control. Output amplifiers 1020, 1022 are provided to amplify the signals to the various relays. An electrically alterable ROM 1024 is provided to permit memory storage of errors and cycle options. Timing circuitry 1026 is provided for the microcomputer U1. A watch dog timer circuit 1028 is shown in FIG. 7A which prevents a hang up of the control system for a time period greater than a predetermined set time. Power up reset and power down circuitry 1030 is provided. Cycle and cancel inputs are provided through keypad 842 connector J7 and a turn off circuit 1034 receives the cancelled signal.

While a preferred embodiment has been shown, modifications and changes may become apparent to those skilled in the art which shall fall within the spirit and scope of the invention. It is intended that such modifications and changes be covered by the attached claims.

We claim as our invention:

1. A method of operation of an automatic appliance including diagnosing operational errors comprising the steps of:
   (a) sensing the occurrence of an operational error;
   (b) identifying the type of error to a user, a first type of error being errors about which servicing should be requested to correct the error, a second type of error being errors about which servicing need not be requested to correct the error;
   (c) alerting the user to request servicing if the error is of the first type;
   (d) displaying information identifying the error to the user if the error is of the second type; and
   (e) determining if information identifying the error is to be stored for later retrieval by service personnel if the error is of the second type.

2. In the method of claim 1, the step of storing information identifying the error for later retrieval by service personnel if the error is the first type.

3. In the method of claim 2, wherein said information identifying the error comprises an error code.

4. In the method of claim 2, where said storage information identifying the error further comprises quantitative data about said error.

5. In the method of claim 1, the step of storing information identifying the error if it is determined that the information is to be stored.

6. In the method of claim 1, the step of placing the appliance in a particular mode responsive to the type of error sensed.

7. A method of diagnosing operational errors during the operation of an automatic appliance comprising the steps of:
   (a) sensing the occurrence of an error in the operation of the appliance;
   (b) determining whether the error is of a first type;
   (c) storing information pertinent to the error if the error is the first type and then visually alerting a user to request servicing of the appliance;
   (d) displaying a message identifying the error if the error is not of the first type and then determining whether the error is of a second type;
   (e) storing information identifying the error if the error is of a second type; and
   (f) placing the appliance in a mode responsive to the type of error.

8. In the method of claim 7, the step of placing the appliance out of operation if the error is of the first type.

9. In the method of claim 8, the error of the first type being a power failure or an uncorrectable out of balance condition of a washer.

10. In the method of claim 7, allowing the appliance to continue to operate in response to an error of the second type when placing said appliance in a mode responsive to the type of error.

11. An automatic appliance including a diagnostic system, comprising:
    (a) means for sensing the occurrence of an operational error;

(b) means for identifying the type of error to a user, a first type of error being errors about which servicing should be requested to correct the error, a second type of error being errors about which servicing need not be requested to correct the error;

(c) means for alerting the user to request servicing if the error is of the first type;

(d) means for displaying information identifying the error to the user if the error is of the second type; and (e) means for determining if information identifying the error is to be stored for later retrieval by a service personnel if the error is of the second type.

12. The automatic appliance of claim 11, including means for storing information identifying the error if it is determined that the information is to be stored.

* * * * *